US009139986B2

(12) United States Patent
Smith et al.

(10) Patent No.: US 9,139,986 B2
(45) Date of Patent: Sep. 22, 2015

(54) SHUT OFF VALVE APPARATUS

(71) Applicant: Waxman Consumer Products Group Inc., Bedford Heights, OH (US)

(72) Inventors: Matthew S. Smith, Wooster, OH (US); Jason A. Sharratt, Wadsworth, OH (US)

(73) Assignee: Waxman Consumer Products Group Inc., Bedford Heights, OH (US)

( * ) Notice: Subject to any disclaimer, the term of this patent is extended or adjusted under 35 U.S.C. 154(b) by 58 days.

(21) Appl. No.: 14/097,847

(22) Filed: Dec. 5, 2013

(65) Prior Publication Data

US 2015/0159351 A1    Jun. 11, 2015

(51) Int. Cl.
*F16K 5/06*    (2006.01)
*E03C 1/02*    (2006.01)
*F16K 31/04*    (2006.01)

(52) U.S. Cl.
CPC . *E03C 1/025* (2013.01); *F16K 5/06* (2013.01); *F16K 31/042* (2013.01); *E03C 2001/026* (2013.01); *Y10T 137/5109* (2015.04); *Y10T 137/5196* (2015.04)

(58) Field of Classification Search
CPC ......... F16K 31/042; F16K 5/06; E03C 1/025; E03C 2001/026; Y10T 137/5109; Y10T 137/5196
USPC ........ 137/269, 270, 884; 251/129.11–129.13, 251/129.04
See application file for complete search history.

(56) References Cited

U.S. PATENT DOCUMENTS

| D147,106 S | 7/1947 | Bradstock et al. | |
| 3,955,791 A * | 5/1976 | Meckstroth | 137/270 |
| D295,280 S | 4/1988 | Walser | |
| D349,327 S | 8/1994 | Bonnell | |
| D355,478 S | 2/1995 | Allen et al. | |
| 5,474,108 A * | 12/1995 | Inden et al. | 137/270 |
| D384,399 S | 9/1997 | Doke | |

(Continued)

OTHER PUBLICATIONS

Informational brochure for Fortrezz Wireless Z-Wave water valve (product No. WV-01), manufactured by Fortrezz LLC, Ortonville, MI. Upon information and belief, the Fortrezz water valve depicted in the brochure was on sale or in public use more than one year prior to the filing date of present application, namely, at least as early as Dec. 4, 2012, and is prior art to the present application. (1 page).

(Continued)

*Primary Examiner* — John Bastianelli
(74) *Attorney, Agent, or Firm* — Tarolli, Sundheim, Covell & Tummino LLP (57) ABSTRACT

A remote-actuated shut off valve apparatus (100) including a valve assembly (200) and a control module (500). The valve assembly includes a valve body (210), a valve member (220), and a motor drive (300) to move the valve member between open and closed states. The control module includes an electronics housing (502) releasably attached to the valve assembly and control electronics (600) disposed within the electronics housing for actuating the valve assembly. A motor shroud (350) overlies a portion of the motor drive (300) and includes first and second contacts (370, 372) electrically coupled to a motor drive (300) of the valve assembly. The electronics housing includes a connector (540) and releasably engages the motor shroud in first and second orientations. In the first orientation, the connector contacts the first contact of the motor shroud. In the second orientation, the connector contacts the second contact of the motor shroud.

20 Claims, 12 Drawing Sheets

(56) References Cited

U.S. PATENT DOCUMENTS

| | | | |
|---|---|---|---|
| 5,771,920 | A | 6/1998 | Jewett et al. |
| 5,794,653 | A | 8/1998 | DeSmet et al. |
| 5,918,629 | A * | 7/1999 | Hayashi et al. ............... 137/884 |
| D416,310 | S | 11/1999 | Uehara et al. |
| 6,026,834 | A * | 2/2000 | Azima ........................ 137/270 |
| D424,028 | S | 5/2000 | Vaiani |
| D424,529 | S | 5/2000 | Raspotnig |
| 6,073,907 | A * | 6/2000 | Schreiner et al. ........ 251/129.12 |
| 6,216,727 | B1 | 4/2001 | Genova et al. |
| 6,374,846 | B1 | 4/2002 | DeSmet |
| 7,314,209 | B2 | 1/2008 | Pierson |
| D598,982 | S | 8/2009 | Bharaj |
| D662,432 | S | 6/2012 | Leaders et al. |
| D681,478 | S | 5/2013 | Riffe |
| D686,697 | S | 7/2013 | Murase et al. |
| D687,124 | S | 7/2013 | Weingarten |
| 8,489,342 | B2 | 7/2013 | Dugger et al. |
| D691,703 | S | 10/2013 | Iranyi et al. |
| D699,322 | S | 2/2014 | Matias et al. |
| D701,943 | S | 4/2014 | Gaertner |
| D704,307 | S | 5/2014 | Lloyd |
| D717,404 | S | 11/2014 | Bailey et al. |
| 2007/0113892 | A1 * | 5/2007 | Chiriac et al. ............... 137/268 |

OTHER PUBLICATIONS

Printouts from www.flowlogic.com website depicting FloLogic system water shut-off valve and control products, manufactured by FloLogic, Inc., Raleigh, N.C. Date of printout Jun. 19, 2015. (4 pages) (Exhibit A).

FloLogic System 3.5 User Manual. FloLogic Shut-Off Valve and Control Product, manufactured by FloLogic, Inc. Raleigh, N.C. Publication Date Jul. 2014. (36 pages) (Exhibit B).

FloLogic System 3.5 installation and Set-Up Instructions, FloLogic Shut-Off Valve and Control Product, manufactured by FloLogic, Inc., Raleigh, N.C. Publication Date Feb. 7, 2014. (23 pages) (Exhibit C).

FloLogic System 3.5 Cut Sheet, FloLogic Shut-Off Valve and Control Product, manufactured by FloLogic, Inc., Raleigh, N.C. Publication date unknown, (2 pages) (Exhibit D).

FloLogic System 3.0 Printable Spec Sheet (documentation for systems purchased in 2012 and later), FloLogic Shut-Off Valve and Control Product, manufactured by FloLogic, Inc., Raleigh, N.C. Publication date unknown. (2 pages) (Exhibit E).

FloLogic System 3.0 Users Manual (documentation for systems purchased in 2012 and later), FloLogic Shut-Off Valve and Control Product, manufactured by FloLogic, Inc., Raleigh, N.C. Publication date Jan. 2012. (36 pages) (Exhibit F).

FloLogic System 3.0 Printable Spec Sheet (documentation for systems purchased in 2011 and earlier), FloLogic Shut-Off Valve and Control Product, manufactured by FloLogic, Inc., Raleigh, N.C. Publication date unknown. (2 pages) (Exhibit G).

FloLogic System 3.0 Users Manual (documentation for systems purchased in 2011 and earlier), FloLogic Shut-Off Valve and Control Product, manufactured by FloLogic, Inc., Raleigh, N.C. Publication date unknown. (36 pages) (Exhibit H).

* cited by examiner

SHUT OFF VALVE APPARATUS

TECHNICAL FIELD

The present disclosure relates to remote-actuated, shut off valve apparatus installed on a water supply line entering a building and, more particularly, to a remote-actuated, shut off valve apparatus that includes a valve assembly, a motor assembly including a motor drive affixed to the valve for opening and closing a valve member of the valve and a motor shroud overlying the motor drive, and a control module including an electronics housing and electronics disposed within the housing, the control module housing detachably affixed to the motor shroud and the electronics electrically coupled to the motor drive to control the motor drive based on radio frequency (rf) signals transmitted to the electronics by a remote hub, the control module electronics housing adapted to be releasably attached to the motor shroud in a selected one of two orientations, the control module electronics housing attached to the motor shroud after installation of the valve assembly on the building water supply line.

BACKGROUND

Residences, including homes, condominiums and apartments, as well as commercial buildings, typically have a main water supply line entering the residence to supply water to the building. The water supply line branches off to various interior water lines extending to the kitchen, bathroom, laundry room, and various appliances, such as a hot water tank, washing machine, dishwasher, etc. Typically, a manual shut off valve is located on the main water line near its entry point into the residence such that the water supply to the entire residence may be turned off by the home owner in the event of a water line leak, an appliance water leak, or other such water leak or overflow problem.

In recent years, various computer-based home automation and management systems have entered the market. One example of such a system is the IRIS® home monitoring and control system offered by Lowe's Home Improvement Stores, Mooresville, N.C. Such home management systems typically include a controller or hub that is located in the home and that is electronically coupled to various home devices and systems such as lighting, HVAC, security, appliances, etc. The home management system provides computer application software, installable on for example, the homeowner's cell phone to allow the homeowner to set values for home devices and systems (e.g., front door light on at 7 pm) and to remotely control home devices and systems via the application running on his or her cell phone. Wireless radio frequency (RF) signals are transmitted from the cell phone to hub. The hub, in turn, controls individual home devices and systems coupled to the hub in accordance with the homeowner's instructions. Home devices and systems may be coupled to the hub via hardwire connection or via wireless communications. Utilizing the home management system application and his or her cell phone, the homeowner may transmit information to the hub, for example, that he or she will not return to the home for a specified period of time. The hub, in turn, will send appropriate control signals the home's HVAC system to change the heat or air conditioning settings of the furnace/air conditioner to conserve energy during the homeowner's absence.

Various home leak detection systems have also been developed that detect a water leak in an appliance or water line and proceed to turn off an associated valve installed on an adjacent water line or appliance water supply line to cease water flow to the leaking appliance or water line.

SUMMARY

One exemplary embodiment of the present disclosure includes a remote-actuated shut off valve apparatus comprising: a valve assembly and control module including an electronics housing releasably attached to the valve assembly and control electronics for actuating the valve assembly, the valve assembly including an elongated valve body defining a throughbore for fluid flow through the valve body, a valve member actuatable between a first open state wherein fluid flows through the valve body and second closed state where fluid flow is blocked, the valve assembly further including a motor drive affixed to the valve assembly, the motor drive including a central axis transverse to the throughbore of the valve body, the motor drive coupled to the valve member and driving the valve member between the first open state and the second closed state, and a motor shroud affixed to and overlying the motor drive, a first contact positioned on one side of the motor shroud and a second contact positioned on an opposite side of the motor shroud, the first and second contacts electrically coupled to the motor drive, the electronics housing configured to releasably engage the motor shroud in a first orientation and a second orientation, the electronics housing defining a cavity that receives and overlies the motor shroud, the inner shell supporting a connector electrically coupled to the control electronics, in the first orientation of the electronics housing, the connector contacting the first contact of the motor shroud to electrically couple the housing control electronics and the valve motor drive and, in the second orientation of the electronics housing, the connector contacting the second contact of the valve motor drive to electrically couple the control electronics and the valve motor drive, the control electronics actuating the motor drive to move the valve member between the first open state and the second closed state.

BRIEF DESCRIPTION OF THE DRAWINGS

The foregoing and other features and advantages of the present disclosure will become apparent to one skilled in the art to which the present disclosure relates upon consideration of the following description of the disclosure with reference to the accompanying drawings, wherein like reference numerals refer to like parts unless described otherwise throughout the drawings and in which.

DETAILED DESCRIPTION

Figure 1:
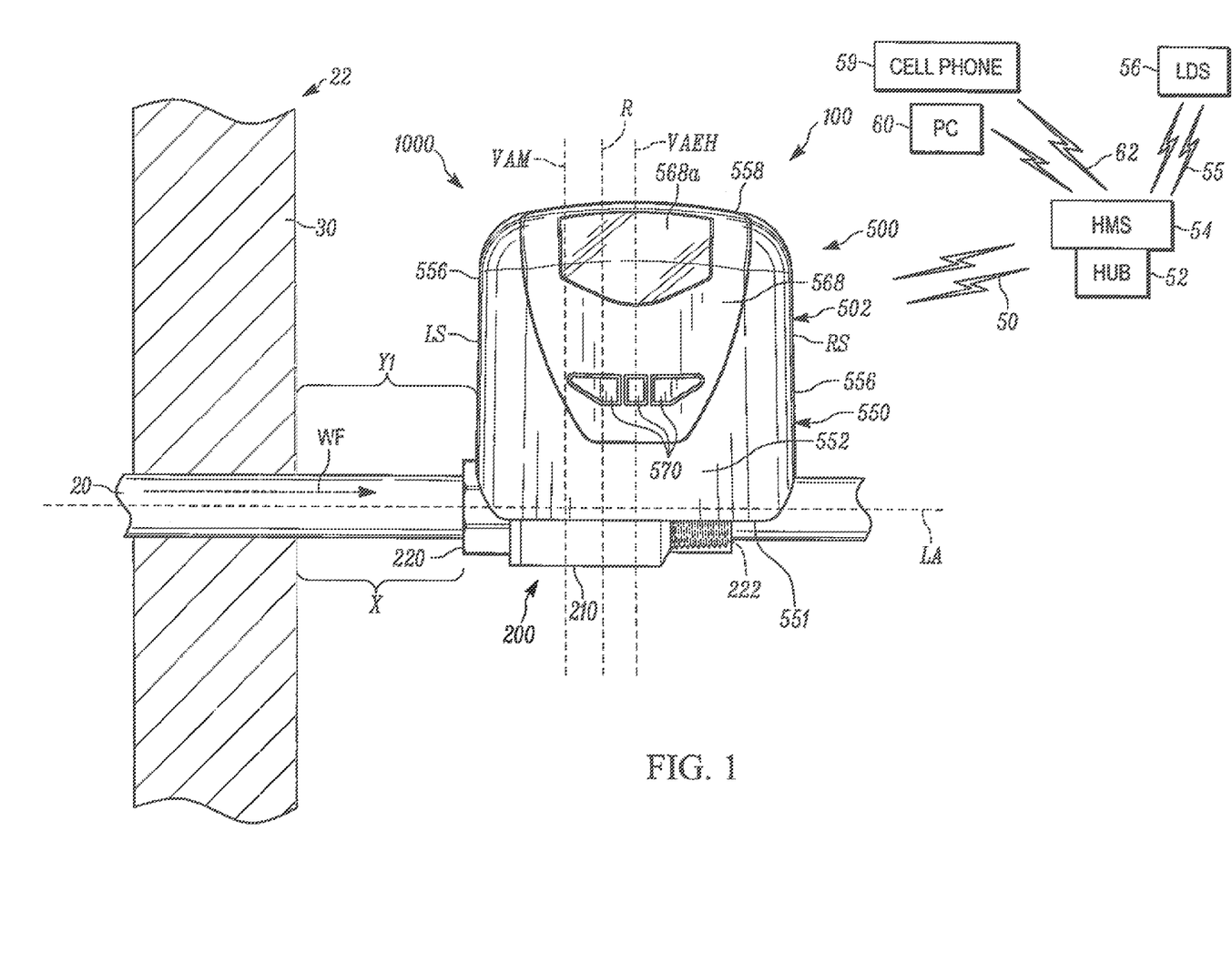
FIG. 1 is a front view, partially in elevation and partially in section, of a first exemplary embodiment of a remote-actuated shut off valve apparatus of the present disclosure including a control module releasable attached to a valve assembly in a first installation orientation of a control module with respect to the valve assembly.

The present disclosure provides for a remote-controlled valve apparatus 100. In one exemplary embodiment, the valve apparatus 100 is a shut off valve that is installed on a water supply line 20 of a building 22, such as a home or commercial building, to turn the water supply to the building on or off by remote actuation of the valve apparatus 100. In one exemplary embodiment and as schematically shown in FIG. 1, the valve apparatus 100 is remotely controlled, that is, turned on or off, by radio frequency (rf) control signals 50 from a hub 52 of a home management system 54. The home management system hub 52 may send rf control signals 50 to the valve apparatus 100 to turn off the water supply to the home 22 upon receiving signals 55 indicating detection of a water leak by a leak detection system 56 of the home 22 or upon receiving signals 62 from the home owner via, for example, the homeowner's cell phone 58 or personal computer 60 instructing the hub 52. Further, if desired, for maintenance purposes, that is, to keep the valve apparatus 100 cycling properly and avoid freezing up, the hub 52 may periodically (e.g., once a month) send control signals 50 to the valve apparatus 100 to close and then re-open the valve apparatus 100.

In one exemplary embodiment of a remote-actuated shut off valve apparatus 100 of the present disclosure, the valve apparatus 100 includes a valve assembly 200 and a removable control module 500. The control module 500 includes an electronics housing 502 releasably attached to the valve assembly 200. In one exemplary embodiment, the electronics housing 502 is in snap fit engagement with a drive motor shroud 350 of the valve assembly 200. Control electronics 600 disposed within the electronics housing 502 actuates the valve assembly 200.

Figure 4:
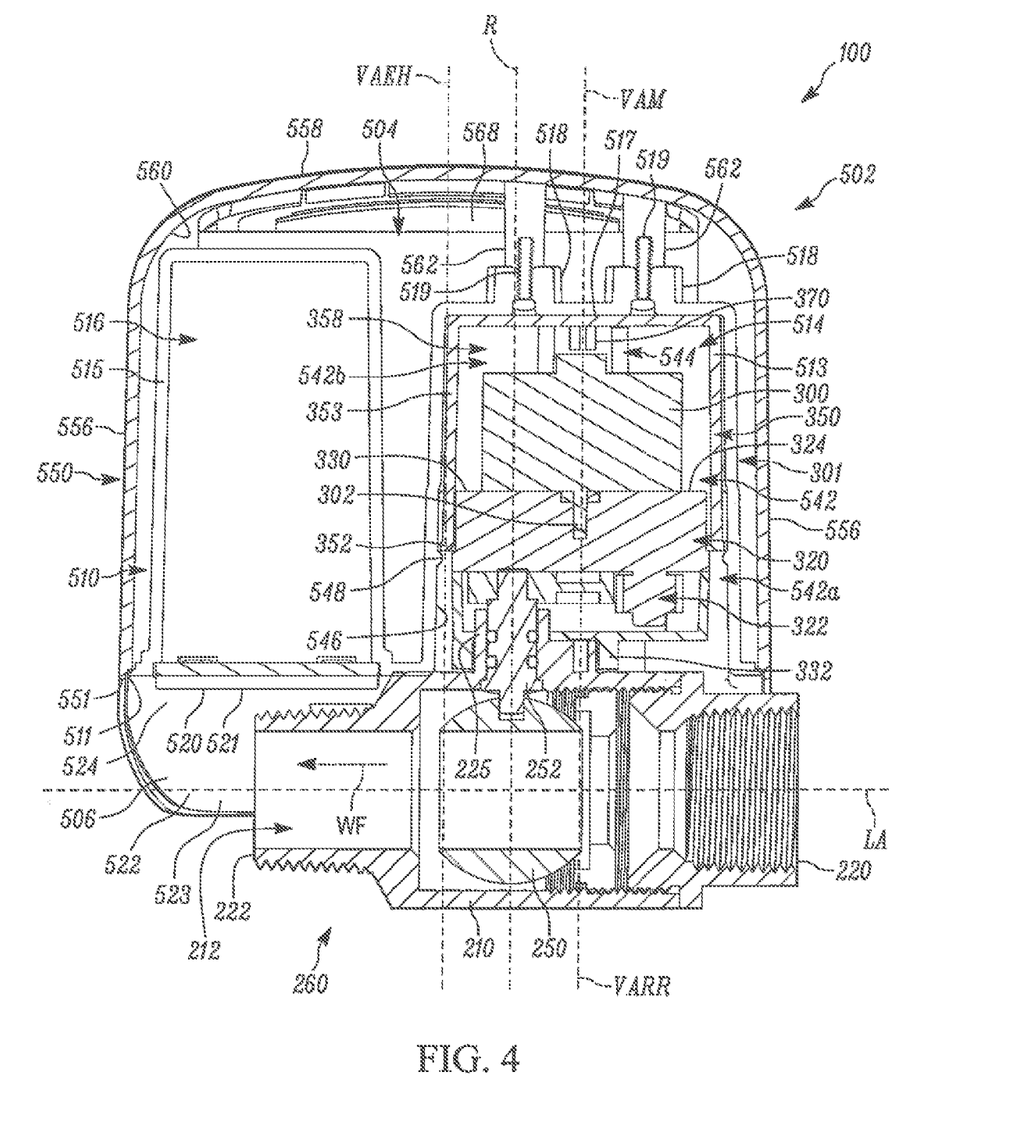
FIG. 4 is a section view of the valve apparatus of FIG. 1, as seen from a plane indicated by the line 4-4 in FIG. 3.

As can best be seen in FIGS. 4-7, the valve assembly 200 includes a valve body 210 affixed to the main water supply line 20 and a valve member 250. The valve body 210 defines a throughbore 212 for fluid flow and valve member 250, such as a ball valve member, is rotatable or movable between an open state where fluid (water) flow through the valve body 210 is open and a closed state where fluid flow through the valve body 210 is blocked. As can be seen in FIG. 1, when the valve body 210 is in the open state, water flow WF flows through the valve body throughbore 212 in a direction from a first, entry end 220 to a second, exit end 222 of the valve body 210. The throughbore 212 of the valve body 210 is generally center about a longitudinal axis LA of the valve assembly 200. The valve body 210 rotates about an axis of rotation R that is substantially orthogonal to and intersects the longitudinal axis LA of the valve assembly 200. As best can be seen in FIG. 4, a valve stem 252 is coupled to and extends upwardly from the valve member 250. The valve stem 252 is seated in the valve body 210, specifically; an upward projection 225 of the valve body 212 surrounds and provides a seat for the valve stem 252. When the valve stem 252 is rotated, the valve body 210 and the valve stem 252 both rotate about the valve body axis of rotation R.

The valve assembly 200 further comprises a valve motor drive assembly 301 including a valve motor drive 300 and a gearbox 320. The valve motor drive 300 includes a rotating drive shaft 302. The drive shaft 302 rotates about a central vertical axis VAM that, like the axis of rotation R of the valve body 210, is substantially orthogonal to and intersects the longitudinal axis LA of the valve assembly 200. The central vertical axis VAM of the drive shaft 302 is horizontally spaced from the valve body axis of rotation R. The gearbox 320 includes a set of gears 322 (FIG. 5) within a housing 324. The set of gears 322 mechanically couple the drive shaft 302 to the valve body 210 and provide a gearing reduction between the drive shaft 302 and the valve body 210. The gearbox 320 rotatably drives the valve stem 252, which, in turn, rotates the valve member 250 between the open and closed states about the axis of rotation R. The gearbox housing 324 is secured to the valve body 212, specifically, a downward projection 332 (FIGS. 4 and 8) of the gearbox housing 324 defines a cavity that fits onto the upward projection 225 of the valve body 212 surrounding the valve stem 252. The drive motor shroud 350 overlies an upper portion 302 of the motor drive 300. The motor shroud 350 includes first and second contacts 370, 372 electrically coupled to the motor drive 300 on opposite sides 310, 312 of the shroud 350.

The control module 500 includes the electronic housing 502 and the control electronics 600. The electronics housing 502 comprises an inner shell 510 and an outer shell 550. The inner and outer shells 510, 550 are in contact at their respective peripheral edges 511, 551, but are spaced apart away from the peripheral edges thereby defining an interior region 504 between the inner and outer shells 510, 550 wherein at least a portion of the control electronics 600 are disposed. In one exemplary embodiment, the control electronics 600 are disposed on a printed circuit board 602. As can best be seen in FIG. 7, the printed circuit board 602 is supported on a pedestal 512 defined by the inner shell 510 and is sandwiched between the inner and outer shells 510, 550 to secure its position within the interior region 504.

The inner shell 510 defines a first recessed region 514 sized to receive and overlie an upper portion 352 of the motor shroud 350. The inner shell 510 includes a connector 540, which is part of the control electronics 600 of the valve apparatus 100. Advantageously, in the valve apparatus 100 of the present disclosure, a central vertical axis VAEH of the electronic housing 502 is offset horizontally from the central vertical axis VAM defined by the drive shaft 302 of the motor drive 300. The electronic housing 502 may be mounted in a selected one of two installation orientations with respect to the valve assembly 200. The two installation orientations of the electronic housing 200 with respect to the valve assembly 200 are shown, respectively, as 1000, 1002 in FIGS. 1 and 2. Further, advantageously, in the valve apparatus 100 of the present disclosure, the control module 500 is assembled to or affixed to the valve assembly 200 only after the valve assembly 200 has been installed on the main water line 20.

Depending on the configuration and position of the home main water supply line 20 with respect to an entry wall 30 of the home 22 through which the water line 20 passes and the desired location of the valve apparatus 100 on the water line 20, it may be desirable to use the first or the second installation orientations. For example, as shown in FIG. 1, if the home main water supply line 20 passes through an entry wall (such as a basement wall 30) of the home 22 and it is desired to install the valve apparatus 100 at a position that is relatively close to the wall 30, i.e., the entry end 220 of the valve body 210 is a short distance X from the wall 30, it is desirable to install the electronics housing the first orientation 1000. In this way, the control module electronics housing 502 is at a distance Y1 from the wall 30 that provides greater clearance. That is, as seen in FIG. 1 the distance Y1 (distance between left side LS of the electronics housing 502 and the wall 30) exceeds the distance X (distance between the entry end 220 of the valve body 210 and the wall 30). As can be seen, the left side LS of the electronics housing 502 is closer to the motor drive central vertical axis VA than a right side RS of the electronics housing 502.

Figure 2:
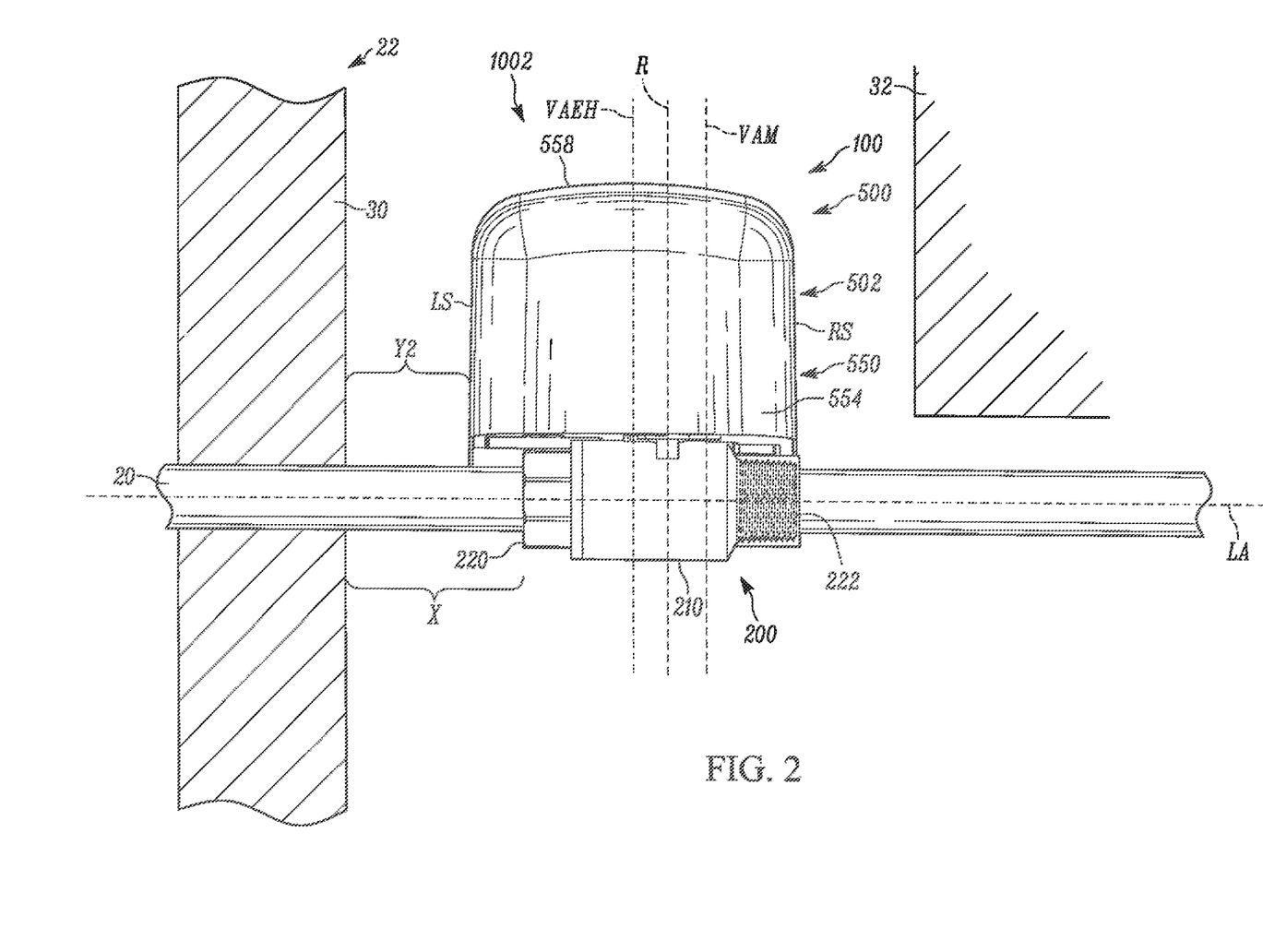
FIG. 2 is a front view, partially in elevation and partially in section, of the valve apparatus of FIG. 1, with the control module in a second installation orientation with respect to the valve assembly.

By contrast, as shown in FIG. 2, if there is an obstruction 32 in a region near the second, exit end 222 of the valve body 210, it would be advantageous to install the control module 500 in the second installation orientation 1002 such that the electronics housing 502 is at a smaller distance Y2 from the wall 30, that is, in the second installation orientation 1002, the distance Y2 is less than the distance X between the entry end 220 of the valve body 210 and the wall 30. That is, in the second installation orientation 1002, the right side RS of the electronics housing 502 is closer to the motor drive central vertical axis VA than the left side 510. Advantageously, as can be seen in FIG. 1, in the first orientation 1000, the central vertical axis VAEH of the electronics housing 502 is offset to the right of the axis of rotation R of the valve member 210, while, as can be seen in FIG. 2, in the second orientation 1002, the electronics housing central vertical axis VAEH is offset to the left of the valve member axis of rotation R.

An additional advantage of the valve apparatus 100 of the present disclosure is that the sensitive control electronics 600 are disposed with the interior region 504 of the electronics housing 502. Thus, the control electronics 600 are out of harm's way when the valve assembly 200 is installed on the main water supply line 30. Installing the valve assembly on the supply line 30 may involve the use of pipe wrenches, pipe threaders, soldering torches and/or other similar tools. Only after the valve assembly 200 is successfully installed on the supply line 30 is the control module 500 then mounted on the valve assembly 200 in the selected, desired orientation 1000, 1002. This reduces the possibility of damage to the control module 500 during installation of the valve apparatus 100. Similarly, if a repair is needed at some point to the valve apparatus 100, disassembly of the control module 500 from the valve assembly 200 is a straightforward reversal of the installation process. If the repair only requires repair or replacement of the control module electronics 600, the valve assembly 200 may advantageously remain in its installed position on the supply line 30. If the repair requires removal of the valve assembly 200 from the supply line 30, the control module 500 is first removed and placed out of harm's way prior to using pipe wrenches, soldering torches or the like to remove the valve assembly 200 from the supply pipe 30.

In the first installation orientation 1000 (FIG. 1) of the electronics housing 502, the connector 540 of the inner shell 510 contacts a first contact 370 of the motor shroud 350 to electrically couple the control electronics 600, including circuitry disposed on the PC board 602, and the valve motor drive 300. In the second installation orientation 1002 (FIG. 2) of the electronics housing 502, the connector 540 contacts the second contact 372 of the valve motor drive 300 to electrically couple the control electronics 600 and the valve motor drive 300. The control electronics 600 actuates the motor drive 300) to move the valve member 250 between the first open state and the second closed state of the valve assembly 200.

Electronics Housing 502

As can best be seen in FIGS. 5 and 7-12, the electronics housing 502 includes the inner housing or shell 510 and the outer housing or shell 550. The inner shell 510 is sized to fit within the outer shell 550 in a nested relationship and define the interior region 504 between the shells 510, 550. When the inner and outer shells 510, 550 are assembled, the shells 510, 550 are in contact along their respective peripheral edges 511, 551.

Inner Shell 510

As is best seen in FIGS. 5 and 9-11, the inner shell 510 includes a generally planar base 520 and a downwardly angled ledge 522 extending from the base 520. A downwardly facing surface 521 defined by the base 520 and a downwardly facing surface 523 defined by the ledge 522 define a bottom surface 506 of the electronics housing 502. The pedestal 512 that supports the PC board 602 extends upwardly from a transition region 524 between the base 520 and the angle ledge 522. Extending upwardly from the base 520 is a first upwardly extending projection 513 and a second upwardly extending projection 515.

The first projection 513 defines the first recessed region 514 that receives the upper portion 352 of the motor drive shroud 350. As can we seen, the shape of the first recessed region 514 is substantially symmetric with respect to a vertical plane VP cutting through the first recessed region 514 in a direction parallel to the longitudinal axis LA. Because the first recessed region 514 is symmetric, the first recessed region 514 may receive the upper portion 352 of the motor drive shroud 350 in either the first orientation 1000 or the second orientation 1002. The first recessed region 514 includes a central region 542 and radially oppositely directed wing regions 544 extending radially outwardly from the central region 542. The central region 542 includes a lower portion 542a that is substantially square rectangular in cross section adjacent the base 520 and an upper portion 542b that is substantially circular in cross section adjacent an upper surface 517 of the first projection 513. The wing regions 544 of the first recessed region 514 receive corresponding shoulders 354 of the motor shroud 350, while the upper portion 542b of the central region 542 receives a cylindrical upper casing 353 of the motor shroud 350 when the control module 500 is assembled to the valve assembly 200. As can be seen, a central vertical axis VARR (FIG. 4) of the first recessed region 514 is horizontally offset from the central vertical axis VAEH of the electronics housing 502. Advantageously, the horizontal offset of the first recessed region central vertical axis VARR from the electronics housing central vertical axis VAEH allows for the opposite vertical offsets of the electronics housing central vertical axis VAEH from the valve member axis of rotation R in the two installation orientations 1000, 1002 (one offset to the left and one offset to the right of the of the valve member axis of rotation R), as described previously.

Figure 3:
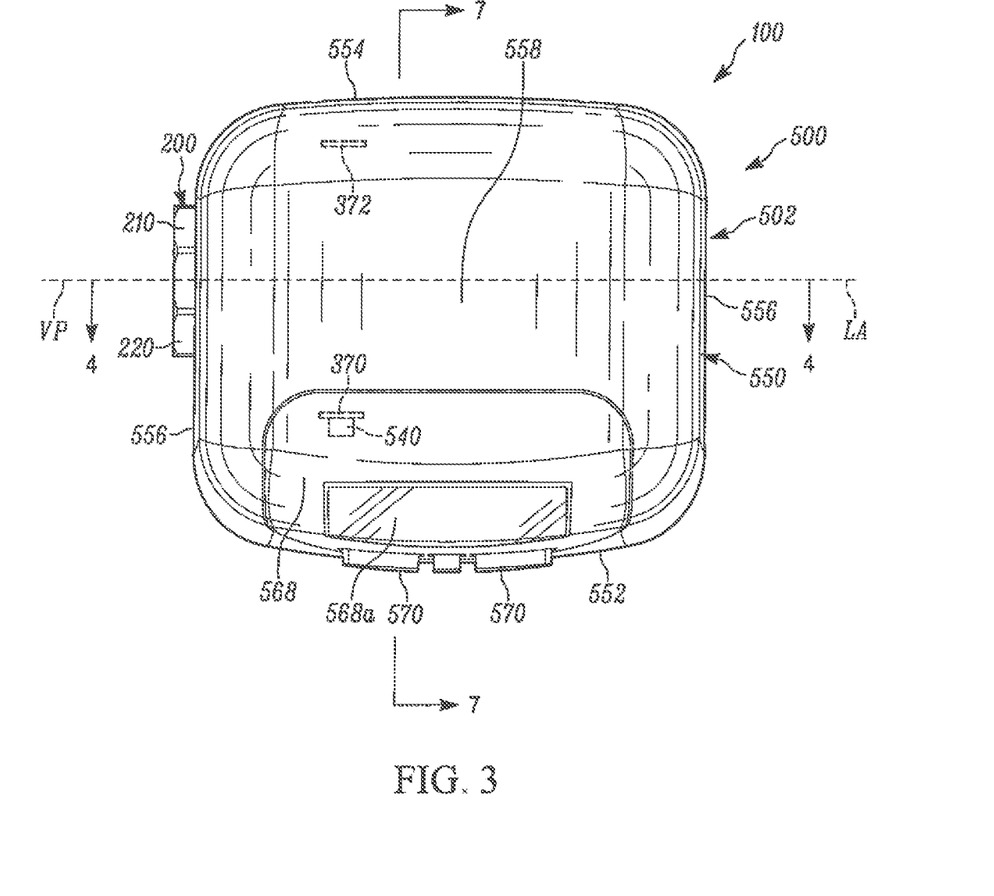
FIG. 3 is a top plan view of the valve apparatus of FIG. 1, with the control module in the first installation orientation with respect to the valve assembly.
Figure 3A:
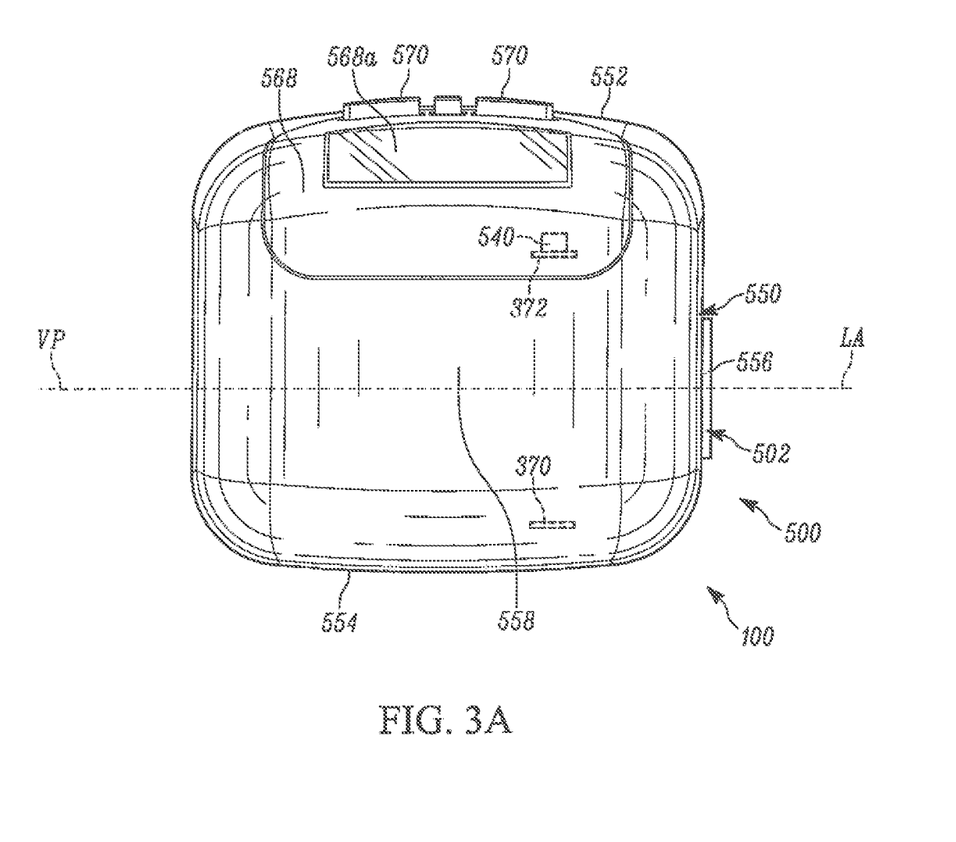
FIG. 3A is a top plan view of the valve apparatus of FIG. 2, with the control module in the second installation orientation with respect to the valve assembly.
Figure 9:
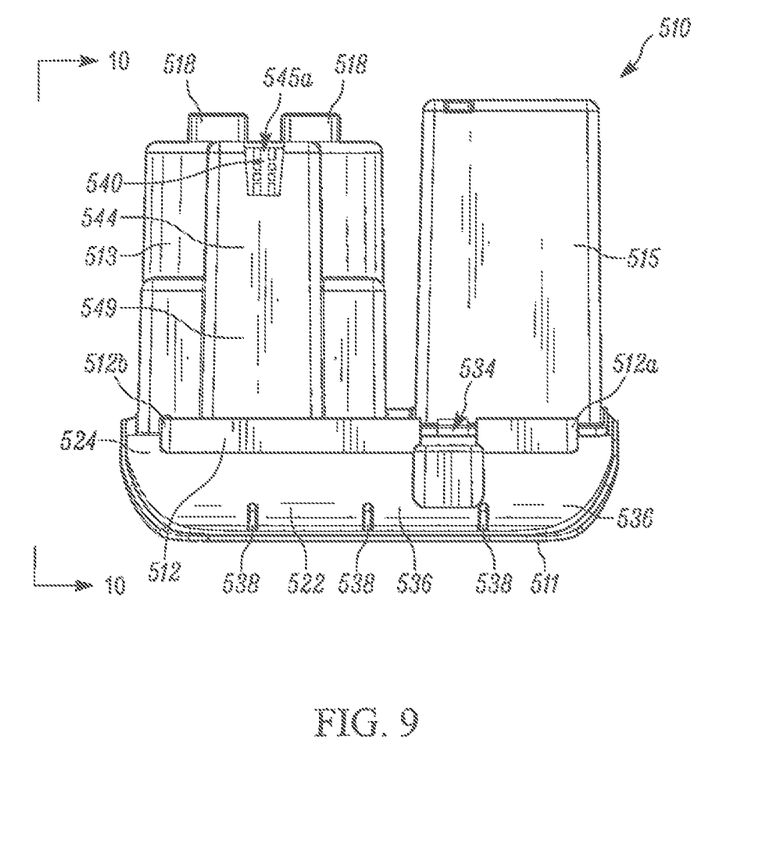
FIG. 9 is a front elevation view of an inner shell of the control module of FIG. 8.
Figure 10:
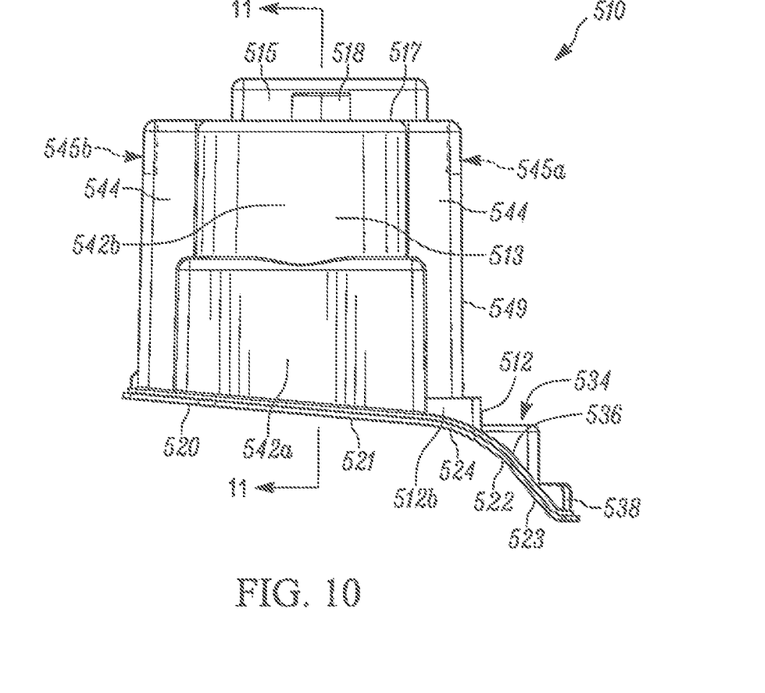
FIG. 10 is a left side elevation view of the inner shell of FIG. 8, as seen from a plane indicated by the line 10-10 in FIG. 9.
Figure 11:
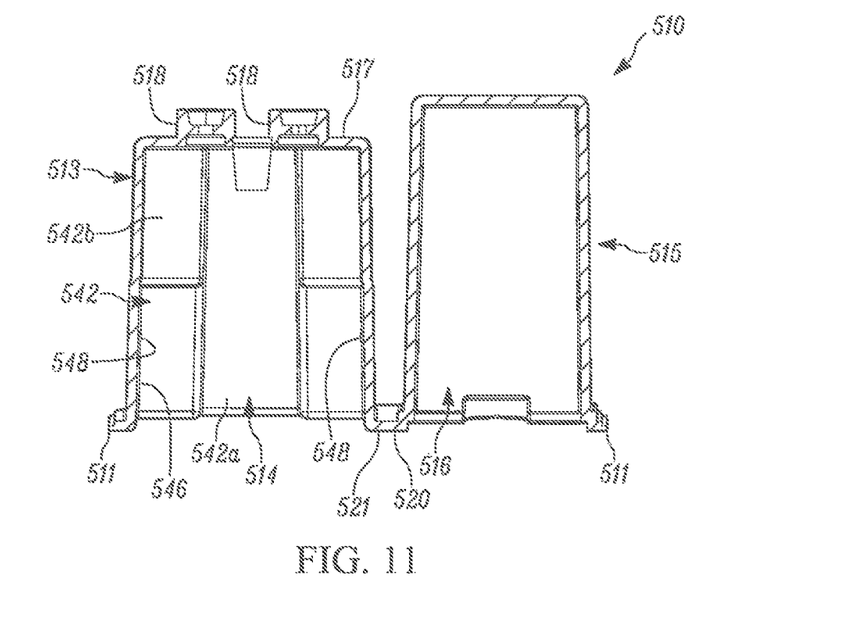
FIG. 11 is a section view of the inner shell of FIG. 8, as seen from a plane indicated by the line 11-11 in FIG. 10.

Each of the wing regions 544 of the inner shell 510 includes a rectangular cutout 545a, 545b adjacent to and extending into the upper surface 517 of the first projection 513. As can be seen in FIG. 9, a forward one 545a of the rectangular cutouts 545a, 545b (that is, the cutout nearest the downwardly angled ledge 522), supports the connector 540. The cutout 545a provides access for the connector 540 to a selected one or the first and second contacts 370, 372 of the drive motor shroud 350 of the valve assembly 200. In the first orientation 1000 of the electronics housing 502 mounted on the valve assembly motor shroud 350, as can be seen schematically in dashed line in FIG. 3, the connector 540 of the inner shell 510 electrically contacts the first contact 370 of the drive motor shroud 350, while in the second orientation 1002 of the electronics housing 502 mounted on the valve assembly motor shroud 350, as can be seen schematically in dashed line in FIG. 3A, the connector 540 of the inner shell 510 electrically contacts the second contact 372 of the drive motor shroud 350. In this way, in either orientation 1000, 1002, the control electronics 600 are electrically coupled to the motor drive 300 to actuate the motor drive 300 and rotate the valve member 250 between open and closed states.

The second projection 515 defines the second recessed region 516. The second recessed region 516 is sized to receive a battery pack (not shown) that is coupled to and provides power to the control electronics 600. The battery pack is enclosed within the second recessed region 516 by a cover 530 that is substantially flush with the lower surface 521 of the base 520. The cover 530 is held in place by a fastener 531 (FIG. 8) that extends through a tongue 532 of the cover 530 and threads into the base 520.

Figure 5:
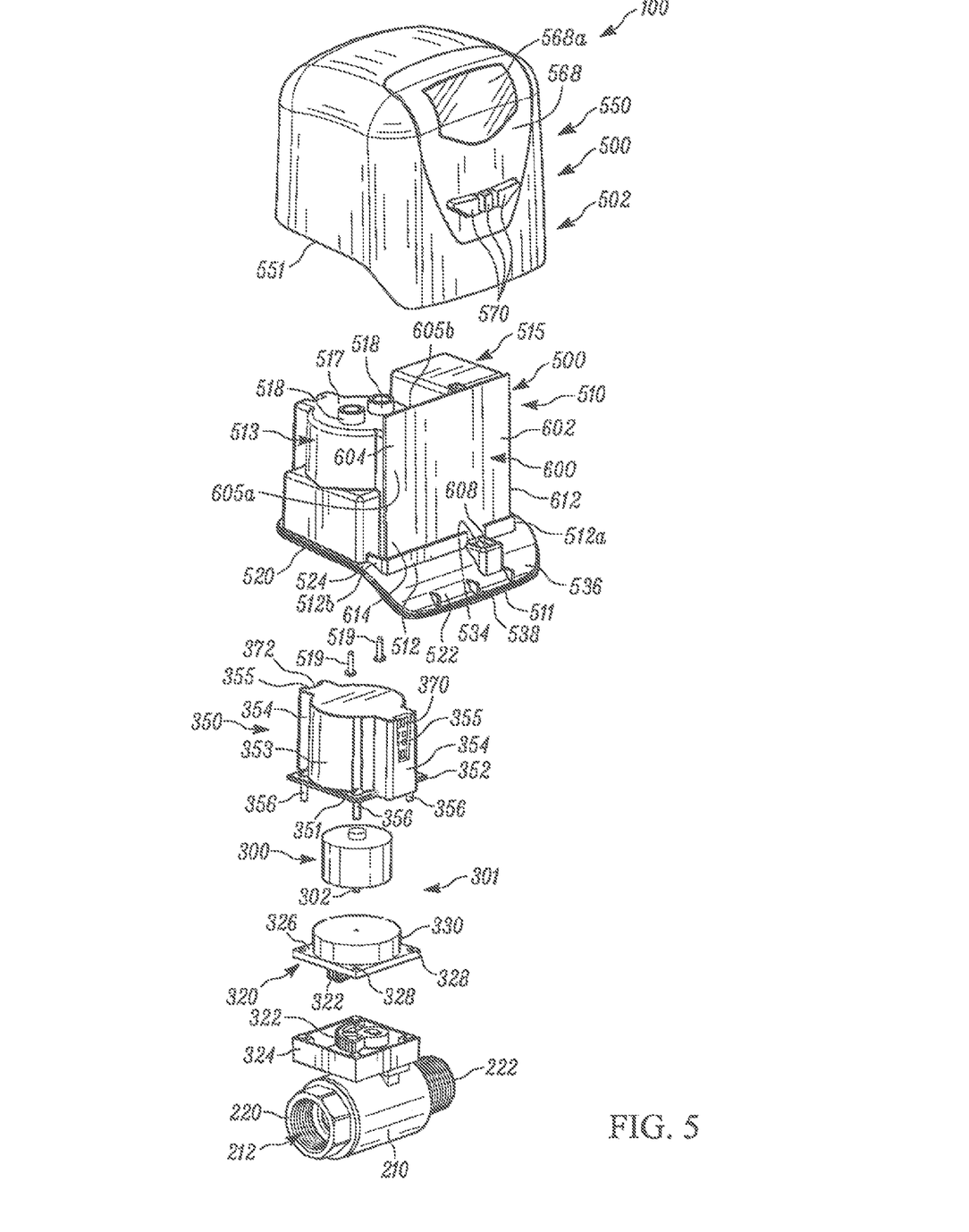
FIG. 5 is an exploded front perspective view of the valve apparatus of FIG. 1.

In one exemplary embodiment and as can best be seen in FIGS. 4 and 5, the inner and outer shells 510, 550 are releasably attached by a threaded engagement between the shells 510, 550, specifically, a pair of downwardly extending cylinders 562 of an inner surface 560 of the outer shell 550 are received in a respective pair of upward cylinders 518 of the upper surface 517 of the first projection 513 of the inner shell 510. The contact of the pairs of cylinders 518, 562 defines a gap between the inner and outer shells 510, 550 and thus defines the interior region 504 between the shells. The pairs of cylinders 518, 562 also include aligned threaded openings that receive a pair of threaded fasteners 519 to releasably secure the inner and outer shells 510, 550.

An opening 534 defined in the angled ledge 522 supports a DC input connector 608 that allows the control electronics 600 to be power by an external DC power supply instead of the battery pack. An upper surface 526 of the angled ledge 522 includes three triangular projections 538, which function as bearing surfaces for a front side 552 of the outer shell 550. In one exemplary embodiment, the assembled electronics housing 502 has a releasable snap fit engagement with the motor drive shroud 350. The first projection 513 that defines the first recessed region 514 includes two inwardly directed ribs 546 defined on an inner surface 546 of the square cross section lower portion 542a of the central region 542. As described below, the ribs 546 engage a peripheral edge 352 of a base 351 of the motor shroud 350 to releasably secure the control module electronics housing 502 to the valve assembly motor shroud 350 via a snap fit or friction fit engagement.

Outer Shell 550

Figure 8:
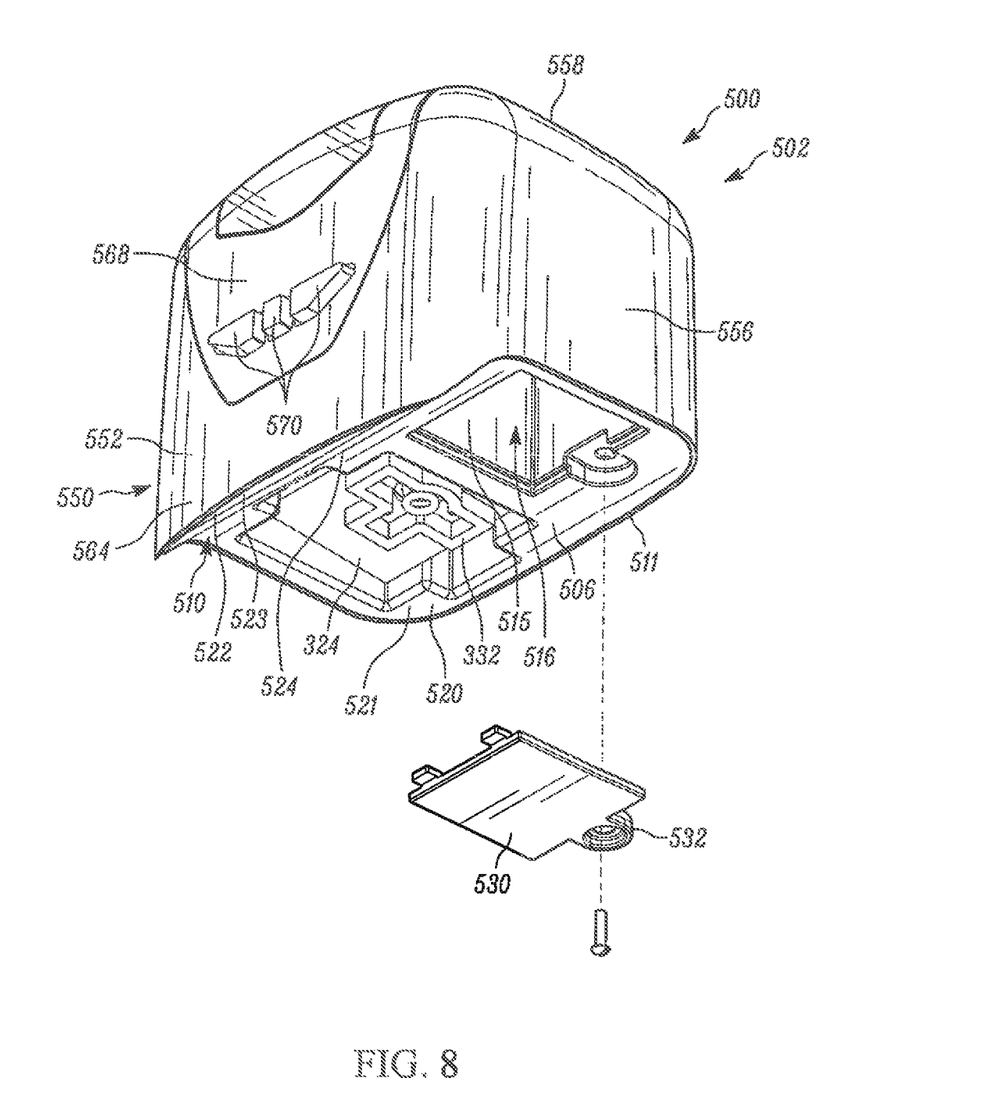
FIG. 8 is a bottom front perspective view of the control module of the valve apparatus of FIG. 1.
Figure 12:
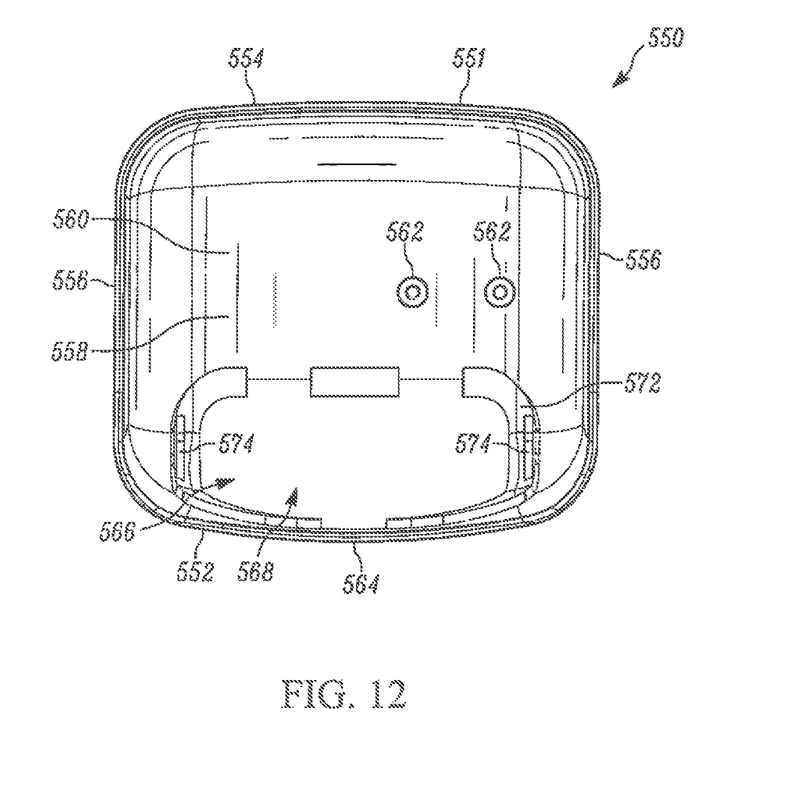
FIG. 12 is a bottom plan view of an outer shell of the control module of FIG. 8.

As can best be seen in FIGS. 5, 8 and 12, the outer shell 550 includes a front side 552 and a back side 554 spaced apart by a pair of vertically oriented sides 556 and a top side 558. The front side 552 includes a lower portion 564 that overlies the downwardly angled ledge 522 of the inner shell and seats against the three triangular projections 538 of the upper surface 536 of the angled ledge 522. The outer shell 550 includes an opening 566 that bridges the front and top sides 552, 558 of the outer shell 550.

A user interface panel 568 is positioned in the opening 566. The user interface panel 568 includes three push button momentary switches 570 including valve close, valve open and synchronization (for synchronization of the control electronics 600 with the rf control signals transmitted by the hub 52) switches that allow the homeowner to control the valve apparatus 100 directly by pushing the momentary switches 570. The momentary switches 570 are part of and electrically coupled to the control electronics 600, including the PC board 602. An upper region 568a of the user interface panel 568 is transparent. Supported to be visible behind the upper region 568a of the user interface panel 568 are a plurality of status indicator lights (not shown), such as LEDs. The status indicator lights allow the homeowner to determine at a glance, for example, the status of the installed valve apparatus 100 and/or whether the main water line 20 to the house is turned off or on. A light pipe 569 is provided for each of the status indicator LEDs to route illumination from the status indicator LEDs to the transparent upper region 568a of the user interface panel 568 such that the light from the status indicator LEDs are readily visible to the homeowner.

The inner surface 560 of the outer shell includes a raised ridge 572 extending about the periphery of the opening 566. The raised ridge 572 includes two beveled support arms 574 that extend downwardly and inwardly into the interior region 504. Advantageously, the PC board 604 is securely positioned in the interior region 504 between the inner and outer shells 510, 550. A lower portion 603 of the PC board 602 is supported by the pedestal 512 extending upwardly from the transition region 524 of the inner shell 510. A right end portion 512a of the pedestal 512 curves around a right side 612 of the PC board 602 to secure the lower portion 603 of the PC board 602. Additionally, the lower portion 603 of the PC board 602 is constrained between the right and left end portions 512a, 512b and between the pedestal 512 and a forward facing surface 549 of the first projection 513 of the inner shell 510.

Figure 7:
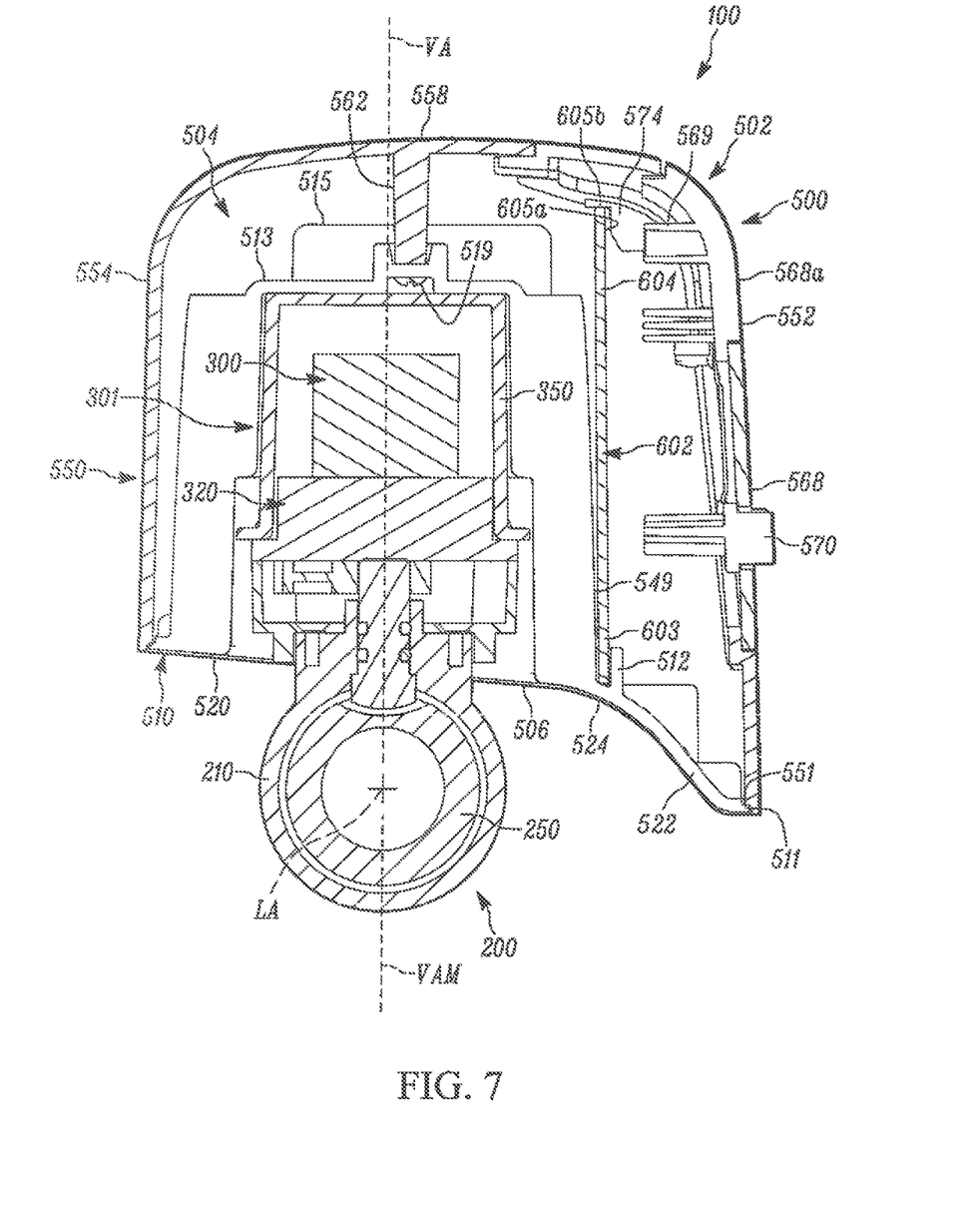
FIG. 7 is a sectional view of the valve apparatus of FIG. 1, as seen from a plane indicated by the line 7-7 in FIG. 3.

Further, as can best be seen in FIG. 7, an upper portion 604 of the PC board 602 is confined by the two beveled support arms 574 of the raised ridge 572 of the outer shell 550. The beveled arms 574 bear against an upper surface 605b of the PC board 602 and limit forward movement of a front surface 605a of the PC board 602. Thus, the PC board 602 is supported in a generally vertical position in the interior region 504 by being sandwiched between the pedestal 512 and the first projection forward facing surface 549 of the inner shell and the beveled support arms 574 of the outer shell 550.

Motor Shroud 350

Figure 6:
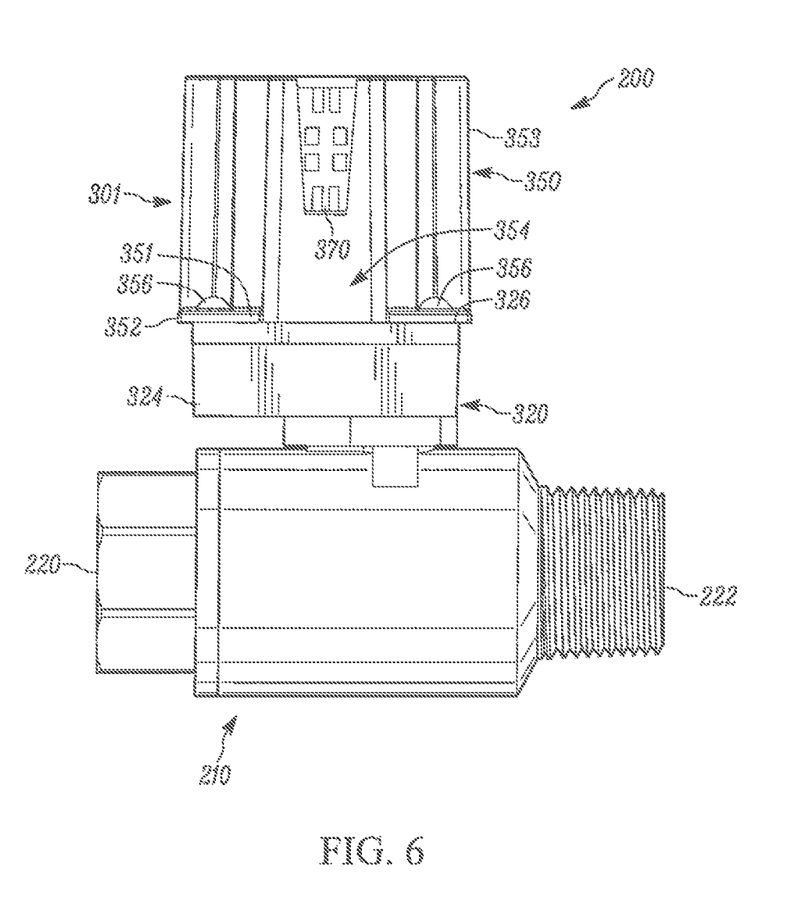
FIG. 6 is a front elevation view of a valve assembly of the valve apparatus of FIG. 1, with the control module removed.

As can best be seen in FIGS. 4-6, the motor shroud 350 overlies the motor drive 300 and is affixed to an upper surface 326 of the gearbox housing 324. In one exemplary embodiment, the motor shroud 350 includes the substantially square base 351 and a cylindrical, hollow upper casing 353 extending upwardly from the base 351. The four fasteners 356 (two of which may be seen in FIG. 6) extend through aligned openings of the base 351 and thread into threaded openings 328 in the upper surface 326 of the gearbox housing 324 to secure the motor shroud 350 to the gearbox housing 324. An interior region 358 defined by the cylindrical casing 353 overlies the motor drive 300 and an upper cylindrical protuberance 330 of the gearbox housing 324.

The peripheral edge 352 of the base 351 of the motor shroud 350 engages a pair of inwardly directed ribs 546 defined on the inner surface 546 of the square cross section lower portion 542a of the first recessed region 514 of the inner shell 510 to releasably affix or connect the control module electronics housing 502 to the valve assembly motor shroud 350 via a snap fit connection. Upon moving the peripheral edge 352 past the pair of ribs 546, the edge 352 of the shroud 350 and/or the inner surface 546 deflect or elastically deform to allow peripheral edge to move past the ribs 546 and then snap back into original position to secure the electronics housing 502 to the motor shroud 350 via a friction fit.

The motor shroud 350 further includes the pair of shoulders 354 extending radially outwardly from the cylindrical casing 353. The shoulders 354 each include a cutout 355 to provide access to the first and second contacts 370, 372 of the motor drive 300 for the connector 540 of the inner shell 510. As previously noted in the first orientation 1000 of the electronics housing 502 mounted on the valve assembly motor shroud 350, the connector 540 of the inner shell 510 electrically contacts the first contact 370 of the motor drive 300, while in the second orientation 1002 of the electronics housing 502 mounted on the valve assembly motor shroud 350, the connector 540 of the inner shell 510 electrically contacts the second contact 372 of the motor drive 300. Further, when the electronics housing 502 is affixed to the valve assembly motor shroud 350, the cylindrical hollow upper casing 353 of the motor shroud 350 is received in the circular cross section upper portion 542b of the first recessed region 514 of the inner shell 510, the pair of shoulders of the motor shroud 354 are received in the winged regions 544 of the first recessed region 514 of the inner shell 510, and the square base 351 of the motor shroud 350 is received in the square cross section lower upper portion 542a of the first recessed region 514 of the inner shell 510.

As used herein, terms of direction and/or orientation such as vertical, horizontal, vertically, horizontally, forward, rearward, backward, longitudinally, upper, lower, inward, outward, axially, radially, etc., are provided for convenience purposes and relate generally to the orientation shown in the Figures. Such direction and/or orientation terms are not intended to limit the scope of the present disclosure or the claims appended hereto.

What have been described above are examples of the present disclosure/invention. It is, of course, not possible to describe every conceivable combination of components, assemblies, or methodologies for purposes of describing the present disclosure/invention, but one of ordinary skill in the art will recognize that many further combinations and permutations of the present disclosure/invention are possible. Accordingly, the present disclosure/invention is intended to embrace all such alterations, modifications, and variations that fall within the spirit and scope of the appended claims.

What is claimed is:

1. A valve apparatus comprising: a valve assembly and an electronics housing, the valve assembly including:
    a valve body defining a throughbore for fluid flow through the valve body,
    a valve member actuatable between a first open state wherein fluid flows through the valve body and second closed state where fluid flow is blocked,
    a drive assembly coupled to the valve member and driving the valve member between the first open state and the second closed state, the drive assembly including a motor drive, and
    a first contact and a spaced apart second contact, the first and second contacts electrically coupled to the motor drive;
    the electronics housing releasably attached to the valve assembly and including control electronics for actuating the valve assembly, the electronics housing configured to releasably engage the valve assembly in a first orientation and a second orientation, the electronics housing supporting a connector electrically coupled to the control electronics and defining a cavity that receives and overlies at least a portion of the valve assembly,
    in the first orientation of the electronics housing, the connector contacting the first contact of the valve assembly to electrically couple the control electronics and the motor drive, and
    in the second orientation of the electronics housing, the connector contacting the second contact of the valve assembly to electrically couple the control electronics and the motor drive.

2. The valve apparatus of claim 1 wherein the valve assembly includes a motor shroud at least partially overlying the motor drive and further wherein the first contact and the second contact of the valve assembly are positioned in spaced apart locations on the motor shroud.

3. The valve apparatus of claim 2 wherein the electronics housing is configured to releasably engage the motor shroud in the first orientation and the second orientation, the electronics housing defining a cavity that receives and overlies the motor shroud, and supporting a connector electrically coupled to the control electronics.

4. The valve apparatus of claim 2 where the control electronics are supported within the interior region.

5. The valve apparatus of claim 4 wherein the connector is disposed on the inner shell.

6. The valve apparatus of claim 2 wherein the first contact is positioned on one side of the motor shroud and the second contact is positioned on an opposite side of the motor shroud.

7. The valve apparatus of claim 1 wherein the electronics housing includes an outer shell, an inner shell and an interior region defined between the outer and inner shells.

8. The valve apparatus of claim 7 wherein an inner surface of the inner shell includes a second recessed region configured to receive a battery pack for powering the control electronics.

9. The valve apparatus of claim 7 wherein a least a portion of the control electronics is disposed on a printed circuit board.

10. The valve apparatus of claim 9 wherein the printed circuit board is supported on a pedestal defined by the inner shell and is disposed in the interior region between the inner and outer shells, the printed circuit board sandwiched between surfaces of the inner and outer shells.

11. A valve apparatus comprising: a valve assembly and an electronics housing releasably attached to the valve assembly and including control electronics for actuating the valve assembly, the valve assembly including:
    an elongated valve body defining a throughbore for fluid flow through the valve body,
    a valve member actuatable between a first open state wherein fluid flows through the valve body and second closed state where fluid flow is blocked,
    a motor drive coupled to the valve member and driving the valve member between the first open state and the second closed state, and
    a motor shroud affixed to and overlying the motor drive, a first contact and a second contact positioned in spaced apart locations on the motor shroud, the first and second contacts electrically coupled to the motor drive; and
    the electronics housing configured to releasably engage the motor shroud in a first orientation and a second orientation, the electronics housing defining a cavity that receives and overlies the motor shroud and supporting a connector electrically coupled to the control electronics,
    in the first orientation of the electronics housing, the connector contacting the first contact of the motor shroud to electrically couple the control electronics and the motor drive, and
    in the second orientation of the electronics housing, the connector contacting the second contact of the motor shroud to electrically couple the control electronics and the motor drive, the control electronics actuating the motor drive to move the valve member between the first open state and the second closed state.

12. The valve apparatus of claim 11 wherein the electronics housing includes an outer shell, an inner shell and an interior region defined between the outer and inner shells.

13. The valve apparatus of claim 12 where the control electronics are supported within the interior region.

14. The valve apparatus of claim 12 wherein the connector is disposed on the inner shell.

15. The valve apparatus of claim 12 wherein the inner shell of the electronics housing includes a recessed region adapted to receive and overlie the motor shroud.

16. The valve apparatus of claim 15 wherein the connector is affixed to the inner shell of the electronics housing in the recessed region of the inner shell.

17. The valve apparatus of claim 12 wherein an inner surface of the inner shell includes a second recessed region configured to receive a battery pack for powering the control electronics.

18. The valve apparatus of claim 12 wherein a least a portion of the control electronics is disposed on a printed circuit board.

19. The valve apparatus of claim 18 wherein the printed circuit board is supported on a pedestal defined by the inner shell and is disposed in the interior region between the inner and outer shells, the printed circuit board sandwiched between surfaces of the inner and outer shells.

20. The valve apparatus of claim 11 wherein the first contact is positioned on one side of the motor shroud and the second contact is positioned on an opposite side of the motor shroud.

* * * * *